United States Patent
Hanisch et al.

(10) Patent No.: US 8,886,404 B2
(45) Date of Patent: Nov. 11, 2014

(54) CONTROL SYSTEM FOR A MOTOR VEHICLE WITH A BOX BODY AND MOTOR VEHICLE

(75) Inventors: Bodo Hanisch, Overath (DE); Martin Schumacher, Siegburg (DE); Georg Hoppe, Waldbroel (DE)

(73) Assignee: Ford Global Technologies, LLC, Dearborn, MI (US)

( * ) Notice: Subject to any disclaimer, the term of this patent is extended or adjusted under 35 U.S.C. 154(b) by 32 days.

(21) Appl. No.: 13/474,141

(22) Filed: May 17, 2012

(65) Prior Publication Data

US 2012/0296521 A1    Nov. 22, 2012

(30) Foreign Application Priority Data

May 18, 2011  (DE) .......................... 10 2011 076 043

(51) Int. Cl.
| | | |
|---|---|---|
| *B60G 17/016* | (2006.01) | |
| *B60G 23/00* | (2006.01) | |
| *B62C 3/00* | (2006.01) | |
| *B62K 25/00* | (2006.01) | |
| *G06F 7/00* | (2006.01) | |
| *G06F 17/00* | (2006.01) | |
| *G06F 19/00* | (2011.01) | |

(52) U.S. Cl.
USPC .............................................. 701/38; 701/37

(58) Field of Classification Search
USPC ............ 701/38, 37, 70, 22, 2, 31.4, 1, 50, 20, 701/24; 340/438
See application file for complete search history.

(56) References Cited

U.S. PATENT DOCUMENTS

| | | | | |
|---|---|---|---|---|
| 5,740,039 | A * | 4/1998 | Hirahara et al. ................. | 701/37 |
| 5,987,369 | A * | 11/1999 | Kwak et al. ...................... | 701/37 |
| 6,122,578 | A * | 9/2000 | Knolle .............................. | 701/37 |
| 6,157,879 | A * | 12/2000 | Kwack et al. .................... | 701/37 |
| 6,233,510 | B1 | 5/2001 | Platner et al. .................... | 701/37 |
| 6,507,778 | B2 * | 1/2003 | Koh .................................. | 701/37 |
| 7,627,408 | B2 * | 12/2009 | Kim et al. ......................... | 701/37 |
| 7,912,603 | B2 * | 3/2011 | Stiller et al. ..................... | 701/37 |
| 7,957,865 | B2 * | 6/2011 | Brookes et al. .................. | 701/37 |
| 8,355,840 | B2 * | 1/2013 | Ammon et al. .................. | 701/37 |
| 8,442,720 | B2 * | 5/2013 | Lu et al. ........................... | 701/38 |
| 2012/0296521 | A1 * | 11/2012 | Hanisch et al. .................. | 701/38 |

FOREIGN PATENT DOCUMENTS

DE    10 2009 009 888 A1    10/2009 ............ B60G 17/00

* cited by examiner

*Primary Examiner* — Thomas Black
*Assistant Examiner* — Robert Payne
(74) *Attorney, Agent, or Firm* — L.C. Begin & Associates, PLLC

(57) ABSTRACT

The invention relates to a control system for a motor vehicle, especially for a commercial vehicle that has a box body supportable on a chassis, with at least one detection means generating detection data for detecting the road profile in front of the vehicle in the direction of travel and a control device for controlling at least one controllable spring and/or damper unit depending on the detected data, wherein the at least one spring and/or damper unit for suspension and damping of the box body in the direction of a vertical axis of the vehicle can be connected to the box body and the chassis.

7 Claims, 2 Drawing Sheets

CONTROL SYSTEM FOR A MOTOR VEHICLE WITH A BOX BODY AND MOTOR VEHICLE

BACKGROUND

The present invention relates to a control system 10 for a motor vehicle 18, in particular for a commercial vehicle 18 with a box body 12 according to the preamble of claim 1 and a motor vehicle 18 according to the preamble of claim 5.

Currently, box bodies on commercial vehicles, such as ambulances, are essentially rigidly connected to the chassis. Accordingly, in particular in the transport of patients, only the existing suspension tuning is decisive for the well-being of patients and for physicians to work safely. Rolling and pitching movements of the vehicle in particular are perceived as very annoying by the patients and physicians.

Active suspension systems, which keep the vehicle body of a motor vehicle at the same level in all driving situations, are well known. For this purpose, in general, a controllable shock absorber (hydraulic actuator) is assigned to each wheel of the vehicle and contains, for example, a vertically adjustable hydraulic cylinder with which the spring can be more or less strongly biased by controlling the oil flow, and thus the spring force can be influenced depending on the driving situation. Such active suspension systems improve driving behavior by counteracting the movements of the vehicle, such as the vertical travel, rolling and/or pitching motions of the vehicle structure. In order to detect these movements, sensors, such as longitudinal and lateral acceleration sensors and vertical travel sensors, are usually mounted on the vehicle. As a result of the currently available capabilities in sensor detection including of the vehicle environment, known active suspension systems, which only respond based on the occurrence of an event that causes a change in vehicle dynamics, such as, for example, uneven road surfaces, are combined with a forward-looking road elevation profile recognition system in order to improve the ride comfort still further by proactive adaptation of the suspension to unevenness of the road.

Thus, for example, from U.S. Pat. No. 6,233,510 B1 a method and a system are known for predicting a road profile for use in vehicle control, for example for anti-lock braking systems and suspension systems. The road condition is determined in advance and used to influence the spring units of the vehicle. A sensor—such as a laser sensor or an image detection sensor—detects the road surface in front of the vehicle and transmits the sensor data to a control unit, which predetermines the road elevation profile lying in front of the vehicle in the direction of travel. An active suspension system with a multiplicity of spring or damper units is influenced and the spring rate, the damping rate, the pressure, the level, etc. are controlled or regulated depending on this road elevation profile.

Furthermore, a method for controlling a vehicle suspension is known from DE 10 2009 009 888 A1. The vehicle has an active suspension comprising controllable spring or damper units. Using a detection device, detection data are generated that indicate the influence of the road profile on the position and/or the movement of the vehicle structure. Furthermore, an actuation parameter is determined by a control unit depending on the detected data and forms the basis of the control of the adjustable spring or damper units of the active suspension. Moreover, the actuation parameter in the disclosed control method is also additionally dependent on a control element of a conventional active suspension control system that reacts to events that influence the vehicle dynamics.

SUMMARY

The invention relates to a control system for a motor vehicle, especially for a commercial vehicle that has a box body supportable on a chassis, with at least one detection means generating detection data for detecting the road profile in front of the vehicle in the direction of travel and a control device for controlling at least one controllable spring and/or damper unit depending on the detected data, wherein the at least one spring and/or damper unit for suspension and damping of the box body in the direction of a vertical axis of the vehicle can be connected to the box body and the chassis.

Moreover, the invention relates to a motor vehicle equipped with said control system, in particular a commercial vehicle, which has a box body connected to a chassis, wherein the box body is connected to the chassis via the at least one spring and/or damper unit for suspension and damping in the direction of a vertical axis of said vehicle.

BRIEF DESCRIPTION OF THE DRAWINGS

FIG. 3 is a schematic view of a spring or damper unit connected to the box body and the chassis.

DETAILED DESCRIPTION OF THE INVENTION

Figure 1:
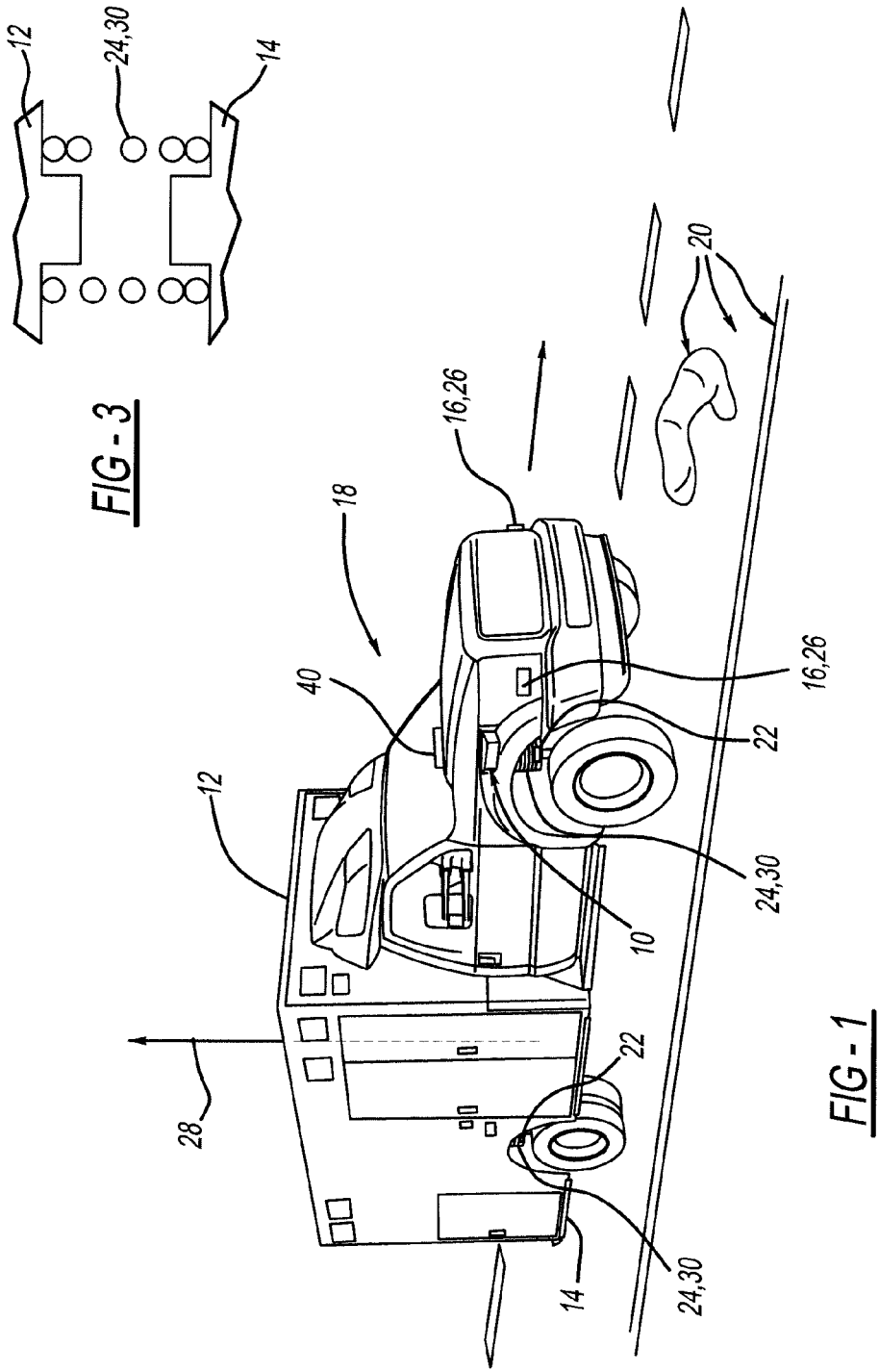
FIG. 1 is a schematic view of a vehicle incorporating various aspects of the control system of the present invention.
Figure 2:
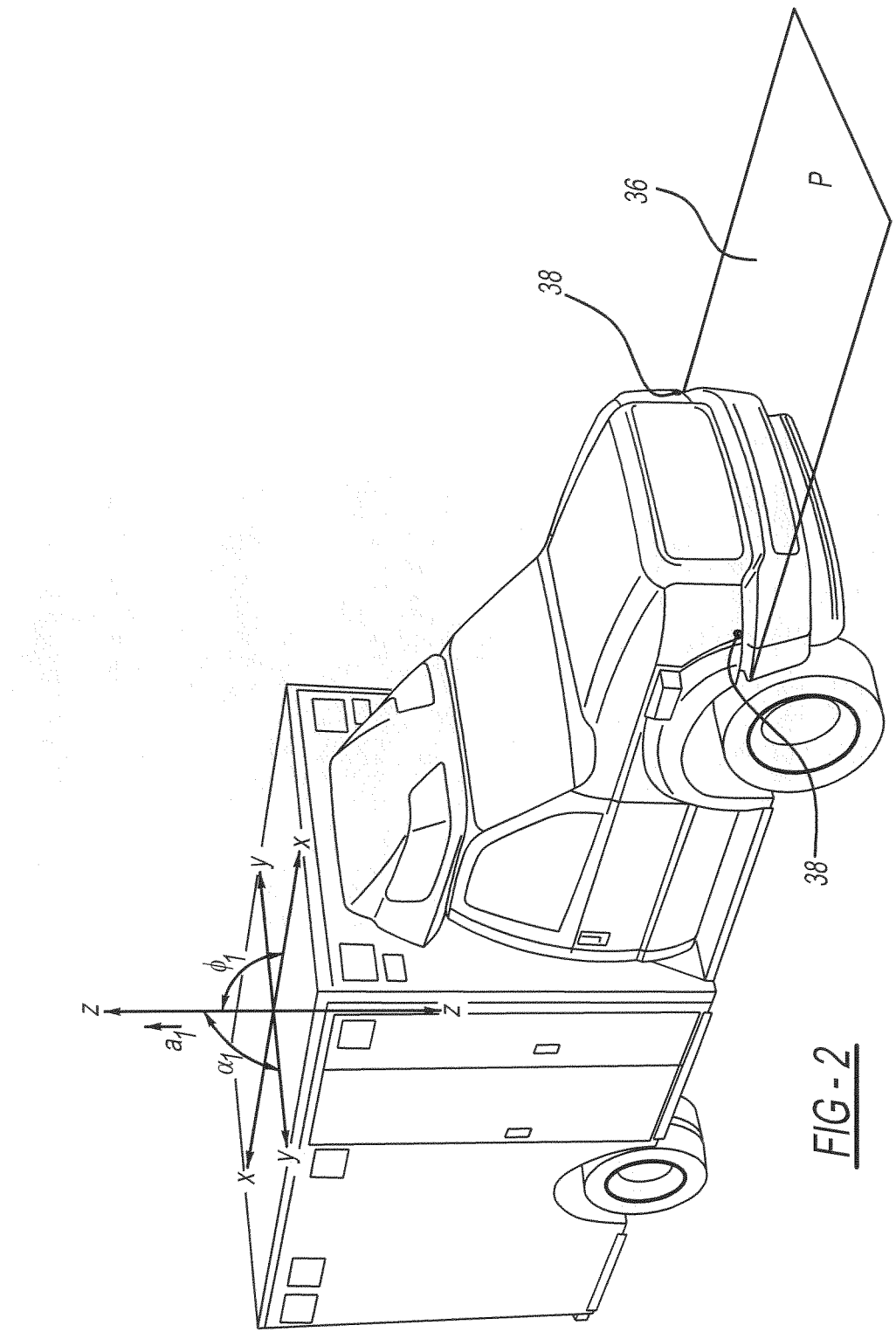
FIG. 2 is a schematic view of a vehicle incorporating various aspects of the control system of the present invention.

Against this background, and with reference to FIGS. 1 through 3, the present invention has the task of at least partially compensating for the driving situation dependent motions of a box body 12 supported on a chassis 14 of a motor vehicle 18, in particular a commercial vehicle 18, and thus to improve the ride comfort and significantly affect driving safety in a positive sense.

This objective is achieved by a control system 10 with the characteristics of claim 1 and by a motor vehicle 18 with the characteristics of claim 5. Furthermore, particularly advantageous embodiments of the invention are disclosed in the dependent claims.

It should be noted that the features listed individually in the claims can be combined with each other in any technically meaningful way and show further embodiments of the invention. The description additionally characterizes and specifies the invention.

According to the invention, a control system 10 for a motor vehicle 18, especially for a commercial vehicle 18 that has a box body 12 supportable on a chassis 14, comprises at least one measurement data generating detection means 16 for detecting the road profile 20 in front of the vehicle 18 in the direction of travel and a control device 22 for controlling at least one controllable spring 24 and/or damper unit 30 as a function of the detected data 26, wherein the at least one spring 24 and/or damper unit 30 for suspension and damping of the box body 12 in the direction of a vertical axis 28 of the vehicle 18 is connected to the box body 12 and to the chassis 14.

As a motor vehicle 18 or commercial vehicle 18 in the context of the present invention, in particular those vehicles are defined as having a box body 12 supported on a chassis 14 of the vehicle 18, wherein a box body 12 is formed with generally solid walls in the form of a closed box. The special design of the box body 12 itself plays essentially no role in the invention. Thus, the box body 12 can for example be made of a steel ladder frame, rigid side walls made of wood or aluminum or even of plastic. Similarly, different types of box body 12 can be used, for example so-called simple plywood boxes, variants in aluminum or lightweight sandwich through to thermally insulated cases. For heavy goods vehicles the structure is usually separated from the cab. For smaller vans with box structures, however, variants with a passage to the cab are also used.

The detecting device 16 essentially comprises one or more scanning units 38 of a road sensor 16, for example a laser sensor or an image detection sensor, wherein the scanning units 38 sense the road profile 20 of the road in front of the vehicle 18 in the direction of travel and provide corresponding detection data or raw detection data. Thus, advantageously, for example, each side of the motor vehicle 18 has at least one associated scanning unit 38, by means of which the road profile 20 is recorded in a predetermined area in front of a wheel, especially a front wheel of the vehicle 18, and thus individually for each side of the vehicle 18. However, it is also possible to provide a stereo camera sensor 40 as a road sensor, which can be arranged in this case, for example, behind a windshield of the vehicle 18 and detect the road profile 20 in a predetermined area in front of the vehicle 18.

The detection means 16 can further comprise a treatment unit, to which are supplied the road profile 20 or the raw data values detected by the scanning units and which prepares these road profile values for appropriate further processing by downstream system components and provides the values as detection data. In particular, for example, the processing unit can perform image processing in the case of using a stereo camera 40 as a road sensor, which image processing extracts information from the camera image that is relevant to the control according to the invention.

The detection data prepared in this way are then transmitted to a control device 22. The control device 22 generates control signals dependent on the detected data 26 for at least one controllable spring 24 and/or damper device, for example, for a hydraulic actuator. Controllable spring 24 and/or damping devices in the form of hydraulic actuators have already been explained in the introductory part of this description and are thus known from the prior art, which is why they are not described at this point.

According to the invention, the spring 24 and/or damper device for suspension and damping of the box body 12 in the direction of a vertical axis 28 of the vehicle 18 is connected to the box body 12 and to the chassis 14, so that depending on the number and arrangement of the spring 24 and/or damper devices, pitch, roll and/or vertical travel motions of the chassis 14 can be compensated by the control system 10 according to the invention. Thus, these movements of the chassis 14 are not freely transferred from the chassis 14 to the box body 12 as for a conventional, substantially rigid coupling between the box body 12 and chassis 14.

The control system 10 according to the invention allows the driving situation-dependent pitch, roll and/or vertical motions of the box body 12 of the motor vehicle 18 supportable on the chassis 14 to be at least partially compensated by the coupling of the box body 12 to the chassis 14 that can be produced by the spring 24 and/or damper unit 30, and thus to improve ride comfort to a considerable extent and to positively influence driving safety. In particular, the control system 10 according to the invention can improve the ride comfort even further by using predictive road profile recognition and proactively adapting the spring 24 and/or damper unit 30 to the unevenness of the road. Consequently, the control system 10 can be particularly used to great advantage in such vehicles, for example, in which injured persons are transported, such as in ambulances, or in which shock-sensitive goods are transported.

In an advantageous embodiment of the invention, the control system 10 comprises a multiplicity of controllable spring 24 and/or damping devices, especially hydraulic actuators, which are independently controllable. This means that each control device 22 generates control signals for each controllable spring 24 and/or damper device depending on the detected data 26. Thus, the spring 24 and/or damping devices can be driven independently of each other so as to affect the box body 12 position. The influence or control of the box body 12 position and/or the movement of the box body 12 can be performed in all dimensions. Accordingly, the pitching and/or the rolling and/or the vertical movements of the box body are controlled or regulated.

To further improve the control of the box body 12, the control system 10 according to the invention includes sensors according to a further embodiment of the invention which detect acceleration variables describing the movement of the box body 12, e.g. such as a box body acceleration $a_1$ in the direction of the vehicle's vertical axis 28 and/or a pitching angular acceleration $\emptyset_1$ of the box body 12 and/or a rolling angular acceleration $\alpha_1$ of the box body 12.

Alternatively to or in addition to the above-mentioned sensors, the control system 10 according to the invention comprises sensors according to another embodiment of the invention, which detect the position of the box body 12 relative to a reference plane P,36, wherein the reference plane 36 is determined by the extension plane of the chassis 14. Thus, the box body 12 position relative to the chassis 14 can easily be measured, for example, by measuring the spring travel of the spring 24 and/or damping devices or hydraulic actuators connecting the box body 12 to the chassis 14.

The control system 10 according to the invention and the motor vehicle 18 according to the invention described above are not restricted to the embodiment disclosed herein, but also include other embodiments with the same effect. It is conceivable, for example, that the motor vehicle 18, in addition to the use of the control system 10 according to the invention that minimizes the transmission of vertical, rolling and/or pitching motion of the chassis 14 to the box body 12, comprises an active, responsive, i.e. non-predictive suspension system that maintains the chassis 14 of the vehicle 18 at the same level in all driving situations, i.e. vertical, rolling and/or pitching motions of the chassis 14 are designed to be self-countering. In such a case, the control system 10 according to the invention would further minimize the driving situation-dependent box body 12 movements with the help of forward-looking road profile 20 recording and thus further improve ride comfort. Moreover, sensors 38 for detecting the structure position or the structure acceleration, such as longitudinal and lateral acceleration sensors and travel sensors, could also be used by both control systems in common.

In a preferred embodiment, the control system 10 according to the invention is used in a motor vehicle 18, in particular in a commercial vehicle 18 such as an ambulance or a truck for transporting shock-sensitive goods, with a box body 12 supported on a chassis 14, and comprises at least one detection data generating detection means 16 for detecting the road profile 20 in front of the vehicle 18 in the direction of travel and a control device 22 for controlling at least one controllable spring 24 and/or damper unit 30 depending on the detected data 26, wherein the box body 12 is connected to the chassis 14 via the at least one spring 24 and/or damper unit 30 for suspension and damping in the direction of a vertical axis 28 of the vehicle 18.

What is claimed is:

1. A control system for a motor vehicle, especially for a commercial vehicle, that has a box body supportable on a chassis, with at least one detection means generating detection data for detecting the road profile in front of the vehicle in the direction of travel and a control device for controlling at least one controllable spring and/or damper unit depending on the detected data,
wherein
the at least one spring and/or damper unit for suspension and damping of the box body at least in the direction of a vertical axis of the vehicle is connected to the box body and the chassis so that depending on the number and arrangement of the spring and/or damper devices, pitch, roll and/or vertical travel motions of the chassis can be compensated by the control system.

2. The control system as claimed in claim 1, which comprises:
a multiplicity of controllable spring and/or damper devices, which can be controlled independently of each other.

3. The control system as claimed in claim 1, which comprises:
one or more sensors, which detect acceleration parameters describing the motion of the box body, in particular a box body acceleration in the direction of the vertical axis of the vehicle and/or a pitch angle acceleration of the box body and/or a roll angle acceleration of the box body.

4. The control system as claimed in claim 1 which comprises:
one or more sensors, which detect the position of the box body relative to a reference plane, wherein the reference plane is determined by the extension plane of the vehicle chassis.

5. A motor vehicle, especially a commercial vehicle with a box body supported on a chassis, which comprises:
a control system as claimed in claim 1, wherein the box body is connected to the chassis via the at least one spring and/or damper unit for suspension and damping, at least in the direction of a vertical axis of said vehicle.

6. The control system as claimed in claim 2, which comprises:
one or more sensors, which detect acceleration parameters describing the motion of the box body, in particular a box body acceleration in the direction of the vertical axis of the vehicle and/or a pitch angle acceleration of the box body and/or a roll angle acceleration of the box body.

7. The control system as claimed in claim 2 which comprises:
one or more sensors, which detect the position of the box body relative to a reference plane, wherein the reference plane is determined by the extension plane of the vehicle chassis.

* * * * *